United States Patent [19]

Seki et al.

[11] Patent Number: 5,163,171
[45] Date of Patent: Nov. 10, 1992

[54] METHOD OF SETTING NC DATA OUTPUT FORMAT

[75] Inventors: Masaki Seki; Takashi Takegahara, both of Tokyo; Toru Matsunaka, Yamanashi, all of Japan

[73] Assignee: Fanuc Ltd., Japan

[21] Appl. No.: 455,317

[22] PCT Filed: May 2, 1989

[86] PCT No.: PCT/JP89/00468
§ 371 Date: Jan. 4, 1990
§ 102(e) Date: Jan. 4, 1990

[87] PCT Pub. No.: WO89/11121
PCT Pub. Date: Nov. 16, 1989

[30] Foreign Application Priority Data

May 10, 1988 [JP] Japan .................. 63-113072

[51] Int. Cl.⁵ .............. G05B 19/18; G06F 15/16
[52] U.S. Cl. .................... 318/570; 318/571; 318/572; 364/474.11; 364/474.15
[58] Field of Search .............. 318/560-646; 364/474.01-474.33

[56] References Cited

U.S. PATENT DOCUMENTS

| | | | |
|---|---|---|---|
| 4,204,253 | 5/1980 | vanden Hanenberg et al. | 364/200 |
| 4,404,506 | 9/1983 | Nishimura et al. | 318/561 |
| 4,415,965 | 11/1983 | Imazeki et al. | 364/474 X |
| 4,534,001 | 8/1985 | Nozawa et al. | 364/474 X |
| 4,608,645 | 8/1986 | Niwa et al. | 318/572 X |
| 4,755,927 | 7/1988 | Kishi et al. | 318/568 X |
| 4,815,000 | 3/1989 | Yoneda et al. | 318/571 X |
| 4,853,867 | 8/1989 | Matsumura | 364/474.22 |
| 4,870,560 | 9/1989 | Seki et al. | 364/191 |
| 4,888,534 | 12/1989 | Kuchiki | 318/567 |
| 4,902,951 | 2/1990 | Ohta et al. | 318/632 |
| 4,983,899 | 1/1991 | Komatsu et al. | 318/571 |

Primary Examiner—Paul Ip
Attorney, Agent, or Firm—Staas & Halsey

[57] ABSTRACT

When an NC data output format is to be set, the NC data output format is expressed using characters or symbols, the NC data output format is entered from an operators's panel (19) using the characters or symbols, the characters or symbols of the entered NC data output format are converted into internal codes and the NC data output format is set in a RAM (14). When the NC data output format is to be revised, the NC data output format stored in the RAM (14) is converted from the internal codes to characters or symbols and displayed on a display unit (16), a location to be revised is designated and the location is revised by characters or symbols, and the revised NC data output format is converted into internal codes.

3 Claims, 8 Drawing Sheets

FIG. 2(a)

| COMMAND | F1 | F2 | F3 | F4 | F5 | F6 | F7 | F8 | F9 | F10 |
|---|---|---|---|---|---|---|---|---|---|---|
| COORDINATE SYSTEM SETTING (P1) | 8202 | 0002 | 0001 | 0101 | 0201 | 0004 | | | | |
| POSITIONING/LINEAR CUTTING (P2) | 8202 | 0102 | 0001 | 0101 | 0201 | 00C1 | 0004 | | | |
| ARCUATE CUTTING (P3) | 8202 | 0202 | 0001 | 0101 | 0301 | 0004 | | | | |
| ARCUATE CUTTING (P4) | 8202 | 0302 | 0001 | 0101 | 0201 | 0901 | 0A01 | 0B01 | 00C1 | 0004 |
| --- | --- | --- | --- | --- | --- | --- | --- | --- | --- | --- |

FIG. 2(b)

| COMMAND | F1 | F2 | F3 | F4 | F5 | F6 | F7 | F8 | F9 | F10 |
|---|---|---|---|---|---|---|---|---|---|---|
| COORDINATE SYSTEM SETTING (P1) | 8202 | 0002 | 0001 | 0101 | 0201 | 0004 | | | | |
| POSITIONING/LINEAR CUTTING (P2) | 8202 | 0102 | 0001 | 0101 | 0201 | 00C1 | 0004 | | | |
| ARCUATE CUTTING (P3') | 8202 | 0202 | 0001 | 0101 | 0901 | 0A01 | 00C1 | 0004 | | |
| ARCUATE CUTTING (P4) | 8202 | 0302 | 0001 | 0101 | 0201 | 0901 | 0A01 | 0B01 | 00C1 | 0004 |
| - - - | - - - | - - - | - - - | - - - | - - - | - - - | - - - | - - - | - - - | - - - |

FIG. 3

| FUNCTION CODE | NC DATA OUTPUT FORMAT (SYMBOLIC CHARACTERS) |
|---|---|
| 0000 | NO FUNCTION |
| XX00 | FEED OUTPUT   XX-NUMBER OF FEED OUTPUTS |
| 0001 | X-AXIS POSITION DATA OUTPUT  X00...0 |
| 0101 | Y-AXIS POSITION DATA OUTPUT  Y00...0 |
| 0201 | Z-AXIS POSITION DATA OUTPUT  Z00...0 |
| 0301 | ARC RADIUS DATA OUTPUT  R00...0 |
| 0901 | ARC CENTER X-AXIS POSITION DATA OUTPUT  I00...0 |
| 0A01 | ARC CENTER Y-AXIS POSITION DATA OUTPUT  J00...0 |
| 00C1 | F-CODE OUTPUT   F000 |
| 0B01 | ARC CENTER Z-AXIS POSITION DATA OUTPUT  K00...0 |
| - - - - | - - - - |
| 0002 | POSITIONING (RAPID-TRAVERS) G-CODE OUTPUT  G00 |
| 0102 | LINEAR INTERPOLATION (CUTTING-FEED) G-CODE OUTPUT  G01 |
| 0202 | CIRCULAR INTERPOLATION (CLOCKWISE) G-CODE OUTPUT  G02 |
| 0302 | CIRCULAR INTERPOLATION (COUNTER-CLOCKWISE) G-CODE OUTPUT  G03 |
| 8202 | ABSOLUTE OR INCREMENTAL COMMAND G-CODE OUTPUT G90 OR G91 |
| 8502 | COORDINATE SYSTEM SETTING G-CODE OUTPUT   G50 |
| - - - - | - - - - |
| 0004<br>0104 | EOB (END-OF-BLOCK OUTPUT) EOB<br>EOR (REWIND STOP CODE) OUTPUT % |
| 0025<br>0035 | PALLET CARRY-IN M-CODE OUTPUT   M63<br>SPINDLE FORWARD-ROTATION M-CODE OUTPUT   M03 |
| - - - - | - - - - |

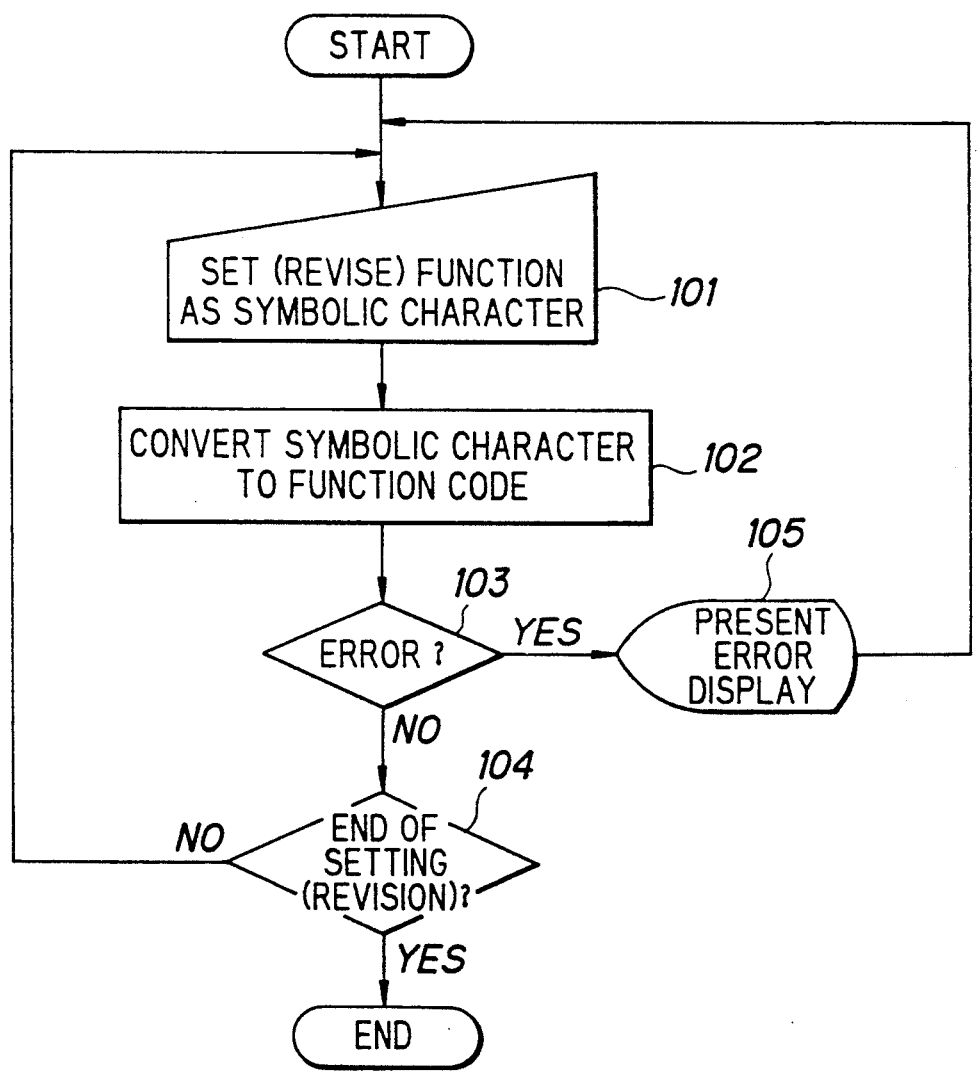

FIG. 7(a)

| COMMAND | F1 | F2 | F3 | F4 | F5 | F6 | F7 | F8 | F9 | F10 |
|---|---|---|---|---|---|---|---|---|---|---|
| COORDINATE SYSTEM SETTING (P1) | 8202 | 0002 | 0001 | 0101 | 0201 | 0004 | | | | |
| POSITIONING/LINEAR CUTTING (P2) | 8202 | 0102 | 0001 | 0101 | 0201 | 00C1 | 0004 | | | |
| ARCUATE CUTTING (P3) | 8202 | 0202 | 0001 | 0101 | 0301 | 0004 | | | | |
| --- | --- | --- | --- | --- | --- | --- | --- | --- | --- | --- |

FIG. 7(b)

| ARCUATE CUTTING (P4) | 8202 | 0302 | 0001 | 0101 | 0201 | 0901 | 0A01 | 0B01 | 00C1 | 0004 |
|---|---|---|---|---|---|---|---|---|---|---|

FIG. 8

| FUNCTION CODE | SYMBOL |
|---|---|
| 0001 | X |
| 0101 | Y |
| 0201 | Z |
| 0901 | I |
| 0A01 | J |
| 0B01 | K |
| 00C1 | F |
| - - - - | - - - - |

| FUNCTION CODE | SYMBOL |
|---|---|
| 0002 | G00 |
| 0102 | G01 |
| 0202 | G02 |
| 0302 | G03 |
| 8202 | G90/91 |
| 0004 | EOB |
| - - - - | - - - - |

FIG. 9

```
** OUTPUT FORMAT **

P1  8202.0002.0001.0101.0201.0004
P2  8202.0102.0001.0101.0201.00C1.0004
P3  8202.0202.0001.0101.0301.0004
    ---------------
    ---------------
    ---------------
```
~CRT

METHOD OF SETTING NC DATA OUTPUT FORMAT

BACKGROUND OF THE INVENTION

1. Field of the Invention

This invention relates to a method of setting NC data output format in an automatic programming system.

2. Description of the Related Art

In automatic programming for creating NC data using an automatic programming language such as APT (automatically programmed tools) or FAPT, (a) a part program based on the automatic programming language is created by defining points, straight lines and circular arcs using simple symbols (this is referred to as "figure definition"), and then defining a tool path using these defined points, straight lines and circular arcs (referred to as "motion statement definition"), and (b) the part program based on the automatic programming language is subsequently converted into NC data, which comprises NC data (EIA codes or ISO codes) in a format capable of being executed by an NC unit, using an NC data output table.

As shown in FIG. 7(a), an NC data output table has a predetermined NC data output format for every command (coordinate system setting, positioning/linear cutting, arcuate cutting, . . . ), and each NC data output format is expressed by a plurality of function codes (internal codes) F1-F10. The function codes F1-F10 are each expressed by a hexadecimal four-digit numeric value, and the meanings of the function codes are as indicated in FIG. 8. Accordingly, the output format of the command P1 for setting a coordinate system is

G90/91,G00,X,Y,Z,EOB and the output format of the command P3 for arcuate cutting is

G90/91,G02,X,Y,R,EOB

There are cases where it is desired to set an NC data output format anew or modify the format, as when adding a special function to a machine tool or causing a machine tool to execute control specific to a user. In such cases, the conventional practice is to display an NC data output table in the form of function codes on a display screen, as shown in FIG. 9, and set the NC data output format anew or alter the format by means of the function codes.

However, when an NC data output format is set or altered, as when the command P4 for arcuate cutting is desired to be set to the following NC data output format:

G90/91,G03,X,Y,Z,I,J,K,F,EOB the conventional practice is to refer to the code table (FIG. 8) to obtain function codes of such characters (symbol characters) as G90/91, G03, X, Y, . . . , and set the output format using these function codes, as shown in FIG. 7(b). Similarly, when a format is modified, the location to be modified is sought from the functional codes of the hexadecimal four-digit numeric values displayed on the display screen, and the location is designated by a cursor to enter the function code, thereby effecting the modification. Consequently, setting or modification requires expenditure of a great amount of time and labor.

SUMMARY OF THE INVENTION

Accordingly, an object of the present invention is to provide a method whereby an NC data output format can be set or modified without using function codes.

Another object of the present invention is to provide an NC data output format setting method whereby an NC data output format can be set or modified using symbol characters so that the time and labor needed for the setting operation can be reduced.

A correspondence table indicating the correspondence between internal codes and characters or symbols is given, an NC data output format is entered in the form of characters or symbols, the entered characters or symbols are converted into internal codes using the correspondence table, and the NC data output format expressed in the internal codes obtained by the conversion is set in a memory. If the NC data output format is to be revised, the internal codes are converted into characters or symbols using the correspondence table, the NC data output format is displayed using the characters or symbols, the location of a revision is designated and revised by characters or symbols, and the revised NC data output format is converted into internal codes using the correspondence table, thereby achieving the revision.

BRIEF DESCRIPTION OF THE DRAWINGS

FIG. 2(a) is a chart illustrating an NC data output table;

FIG. 2(b) is a chart illustrating an NC data output table following revision;

FIG. 3 is a chart illustrating a function code/symbolic character correspondence table;

FIG. 4 is a flowchart of processing for the method of setting an NC data output format according to the invention;

FIGS. 7(a), 7(b), 8 and 9 are views for describing the background of the invention, in which FIGS. 7(a) and 7(b) are charts illustrating an NC data output table, FIG. 8 is a chart illustrating a function code/symbolic character correspondence table, and FIG. 9 is a view of a display unit for describing processing for setting and modifying an NC data output format according to the prior art.

DESCRIPTION OF THE PREFERRED EMBODIMENTS

Figure 1:
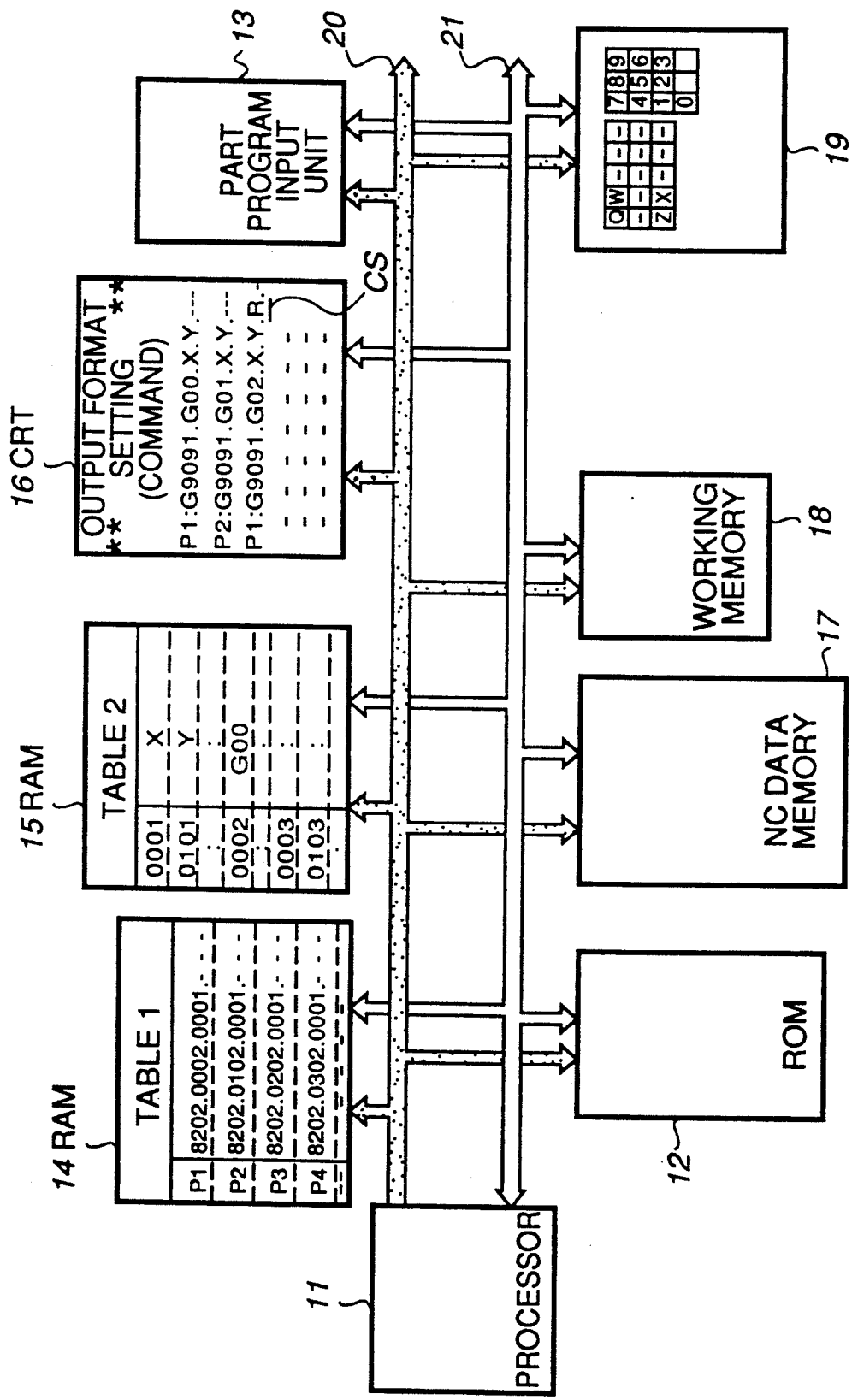
FIG. 1 is a block diagram of an automatic programming apparatus for practicing the present invention.

FIG. 1 is a block diagram of an automatic programming apparatus for practicing the present invention.

Reference numeral 11 denotes a processor which performs predetermined automatic processing under the control of a control program, 12 a memory (ROM) storing a control program for creating NC data, 13 part program input unit for inputting a part program created in an automatic programming language, 14 a RAM, which is backed up by a battery, for storing an NC data output table, 15 a RAM, which is backed up by a battery, for storing a correspondence table giving the correspondence between function codes and symbolic characters of NC data, 16 a display unit (CRT), 17 an NC data memory, 18 a working memory, and 19 an operator's panel.

FIG. 2(a) is a view for describing the NC data output table, in which NC data output formats are provided for respective ones of commands (P1, P2, . . . ). Each NC data output format is expressed by a plurality of function codes F1-F10. Each function code is expressed by a hexadecimal numeric value of four digits, and an NC data output format for one command is specified by a group of several of these function codes.

FIG. 3 is a portion of the correspondence table stored in the RAM 15 and showing the correspondence between the function codes and symbolic characters of NC data.

FIG. 4 is a flowchart of processing for the method of setting an NC data output format according to the invention. Processing in a case where an NC data output format is set and in a case where a set NC data output format is revised will now be described in accordance with the flowchart of FIG. 4.

A. Processing for setting NC data output format

By performing a prescribed operation, the operator causes a dialog screen for setting an NC data output format to be displayed on the CRT 16, enters a command number Pi (i=1, 2, . . . ) and enters the NC data output format of this command by the symbolic characters of the NC data. For example, in a case where the output format of the positioning command P1 is to be set, the operator enters the command P1 and, using the operator's panel 19, enters the following NC data output format for setting a coordinate system (step 101):

G90/91,G00,X,Y,Z,EOB

The processor converts the entered NC data into functions codes using the correspondence table stored in the RAM 15. The correspondence table illustrates the correspondence between the function codes and symbolic characters of NC data. Specifically, the NC data output format

G90/91,G00,X,Y,Z,EOB is converted into 8202, 0002, 0001, 0101, 0201, 0004

Next, the NC data output format of the function codes resulting from the conversion is registered in the NC data output table of RAM 14 (step 102).

It is determined (step 103) whether a conversion error has occurred in the conversion processing of step 102 owing to an instance where an input symbolic character is one which has not been registered in the correspondence table of RAM 15. If a conversion error has not occurred, it is determined whether the setting of the NC data output format has ended (step 104). If the setting operation has ended, processing is terminated; if not, the processing from step 101 onward is repeated. If the decision rendered at step 103 is that a conversion error has occurred, an error display is presented on the CRT 16 (step 105) and processing from step 101 onward is repeated in order to again enter the NC data output format based on the symbolic characters.

B Processing for revising NC data output format

When a function for revising NC data output format is selected by a prescribed operation, the processor 11 calls the NC data output table registered in RAM 14, converts the function codes into symbolic characters using the correspondence table stored in the RAM 15, and showing the correspondence between the function codes and symbolic characters of NC data. By way of example, the following NC data output format based on the function codes of command P1:

8202, 0002, 0001, 0101, 0201, 0004 is converted into the following NC data output format of the symbolic characters:

G90/91,G00,X,Y,Z,EOB

Figure 5:
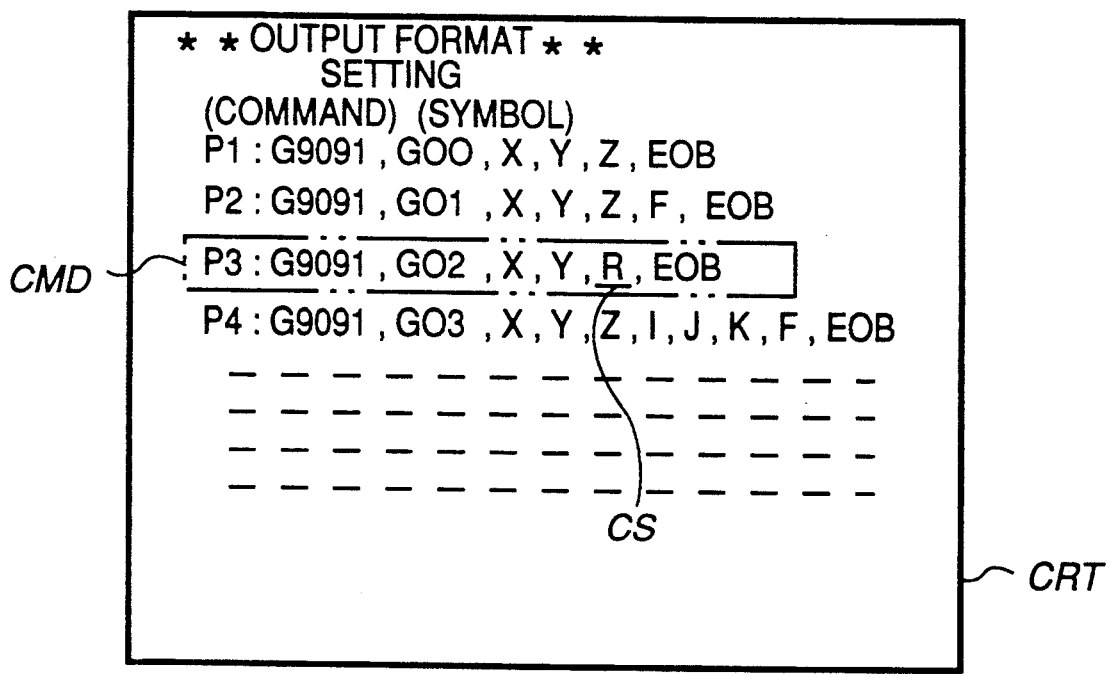
FIGS. 5 and 6 are views of a display unit for describing revision processing according to the present invention.
Figure 6:
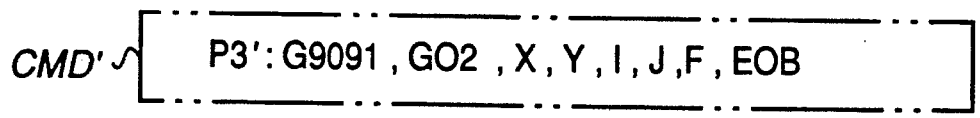

Conversion is performed in similar fashion for P2, P3, . . . , and the symbolic characters are displayed on the CRT 16 (see FIG. 5). Next, the location of a revision is designated, by a cursor CS or the like, from the NC data output format based on the symbolic characters, and a predetermined NC data output format is entered by symbolic characters. For example, if a command CMD for arcuate cutting is desired to be revised to a command CMD' shown in FIG. 6, then the portion to be revised (e.g., "R") in the original command CMD is designated to be deleted by the cursor CS, after which the symbolic characters "I, J, F" are entered (step 101). The processor 11 makes the revision by converting the entered data into function codes using the correspondence table of RAM 15 [see P3' in FIG. 2(b); step 102].

Thereafter, processing from step 103 onward is performed in a manner similar to the setting processing.

In accordance with the present invention as set forth above, an NC data output format is entered in the form of characters or symbols, and the entered NC data output format is converted into internal codes, thereby setting the NC data output format. If the NC data output format is to be revised, the internal codes are converted into characters or symbols, the NC data output format is displayed, the location of a revision is designated and revised by characters or symbols, and the revised NC data output format is converted into internal codes. As a result, the time needed for setting or revision can be shortened and the labor involved can be reduced in comparison with the conventional method in which setting is performed by having to resort to function codes.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. An apparatus for producing an NC data output format for programmed commands, said apparatus comprising:
   read-only memory means for storing a control program to create NC data;
   first storage means for storing an NC data output table indicating NC data output formats for each of the programmed commands;

second storage means for storing a correspondence table giving a correspondence between function codes and symbolic codes of the NC data;

input means for inputting input symbols corresponding to the NC data output format; and processor means, operatively connected to said input means, read-only memory means; said first storage means and said second storage means, for controlling the production of the NC data output format in accordance with the control program by controlling receiving the input symbols from said input means, converting the input symbols into input function codes using the correspondence table, and storing the input function codes as the NC data output format.

2. An apparatus as recited in claim 1, wherein said apparatus further comprising display means for displaying the NC data output format using the symbolic codes.

3. An apparatus as recited in claim 2,
wherein said input means inputs a revision indicator to indicate a revision in the NC data output format, and wherein, based on the revision indicator, said processor means further controls receiving the revision indicator, and revising the function codes of the NC data output format based on the input symbols.

* * * * *